United States Patent [19]

Bleier et al.

[11] 3,926,195
[45] Dec. 16, 1975

[54] CLIP, CLAMPING JAW AND ASSEMBLY FOR THE INTERRUPTION OF THE UROGENITAL SYSTEM

[75] Inventors: Waldemar Bleier, Saarlouis; Max Gremmelspacher, Freiburg, both of Germany

[73] Assignee: Waldemar Bleier, Germany

[22] Filed: Apr. 23, 1973

[21] Appl. No.: 353,374

[30] Foreign Application Priority Data
Apr. 25, 1972 Germany............................ 2220117

[52] U.S. Cl................................ 128/346; 128/321
[51] Int. Cl.²................... A61B 17/08; A61B 17/10
[58] Field of Search............................ 128/304, 346

[56] References Cited
UNITED STATES PATENTS

| | | | |
|---|---|---|---|
| 872,567 | 12/1907 | Langstaff............................. | 128/304 |
| 1,852,542 | 4/1932 | Sovatkin........................... | 128/346 X |
| 2,060,724 | 11/1936 | Carroll............................. | 128/346 X |
| 2,123,890 | 7/1938 | Gossrau........................ | 128/346 UX |
| 2,384,697 | 9/1945 | Riccardi............................. | 128/346 |
| 2,434,831 | 1/1948 | Brandenburg.................. | 128/346 X |
| 3,056,408 | 10/1962 | Brown............................ | 128/346 X |
| 3,063,455 | 11/1962 | Markley.......................... | 128/346 X |
| 3,270,745 | 9/1966 | Wood............................. | 128/346 X |
| 3,315,679 | 4/1967 | Sarracino........................... | 128/346 |
| 3,378,010 | 4/1968 | Codling et al. .................. | 128/346 X |
| 3,461,876 | 8/1969 | Miller, Jr. ............................ | 128/346 |
| 3,518,993 | 7/1970 | Blake................................. | 128/321 |
| 3,541,591 | 11/1970 | Hoegerman........................ | 128/346 |
| 3,608,554 | 9/1971 | McGuinness et al. .......... | 128/346 X |
| 3,678,935 | 7/1972 | Bronstein........................ | 128/346 X |
| 3,825,012 | 7/1974 | Nicoll ................................ | 128/346 |

*Primary Examiner*—Channing L. Pace
*Attorney, Agent, or Firm*—Toren, McGeady and Stanger

[57] ABSTRACT

A clip, a clip opening clamp, a clip expanding clamp, an oviduct holding clamp, a fimbria-holding clamp, an ovary-holding clamp, an uterus hook, a combined clamp and a package of these instruments, each device having its individual inventive shape and property designed advantageously for its specific purpose, and also interfitting with those corresponding devices which are common to them, thus usable as an assembly for a physician to choose from, the most suitable instrument in any particular operation related to the urogenital system and to the long term reversible or irreversible interruption of the vas deferens in human and animal organisms.

7 Claims, 34 Drawing Figures

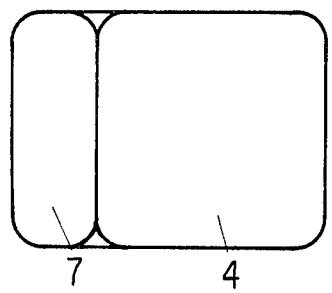
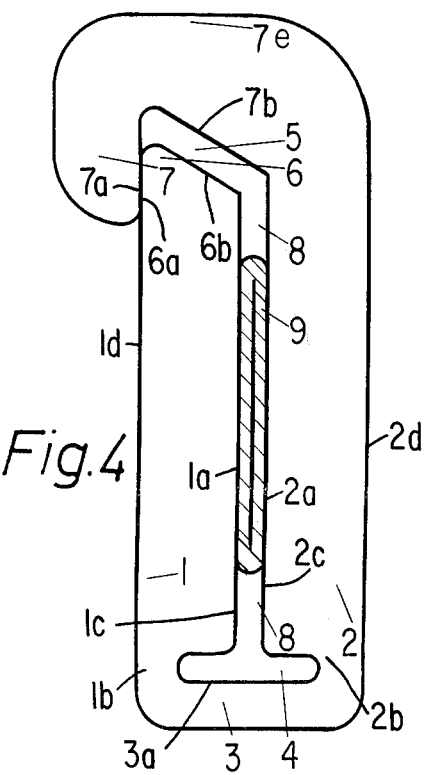
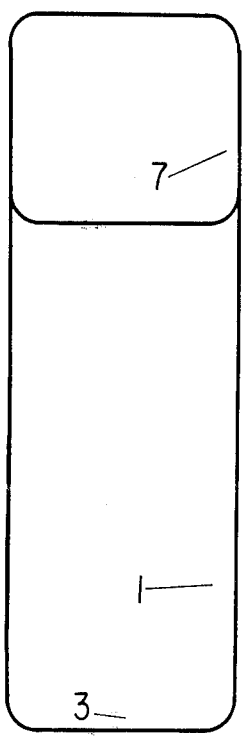
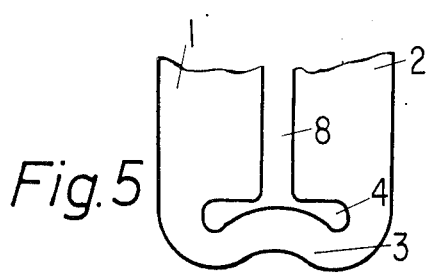

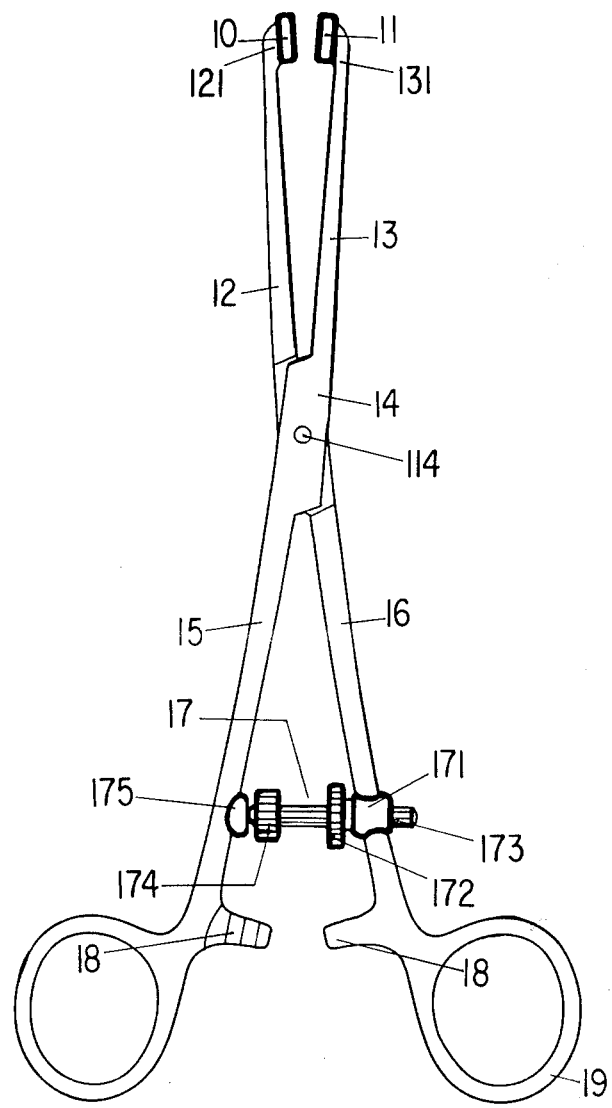

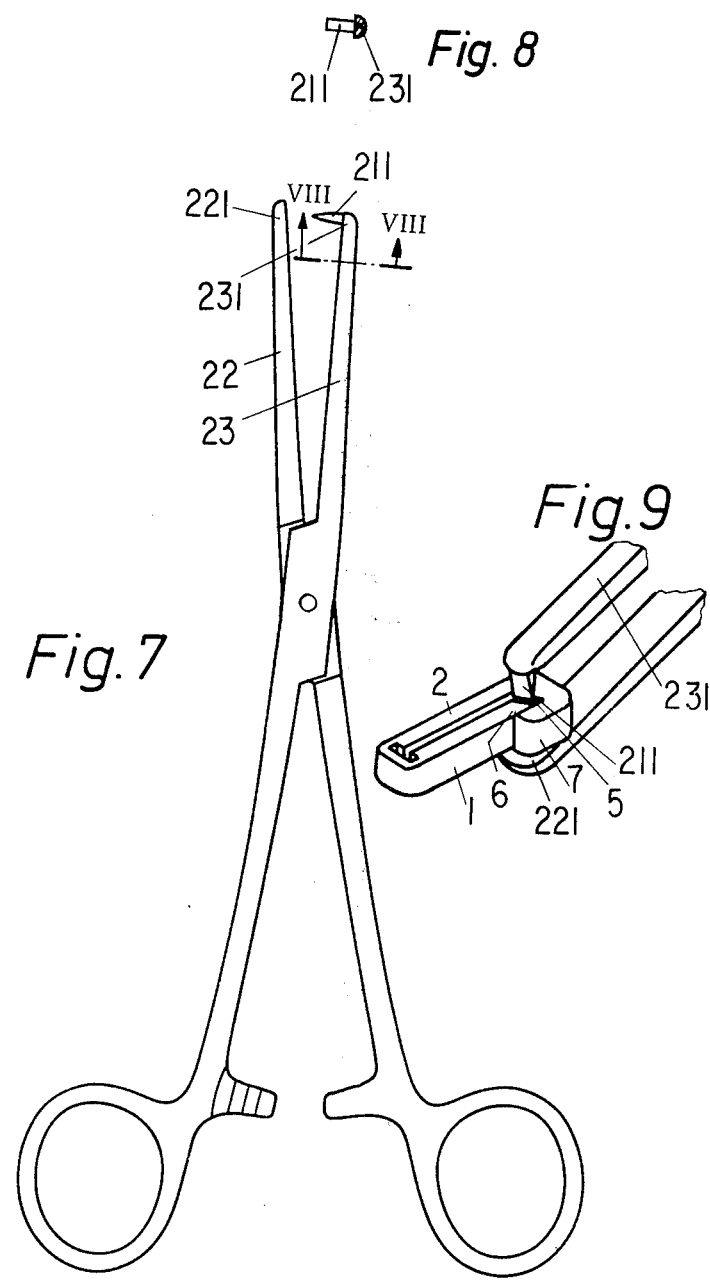

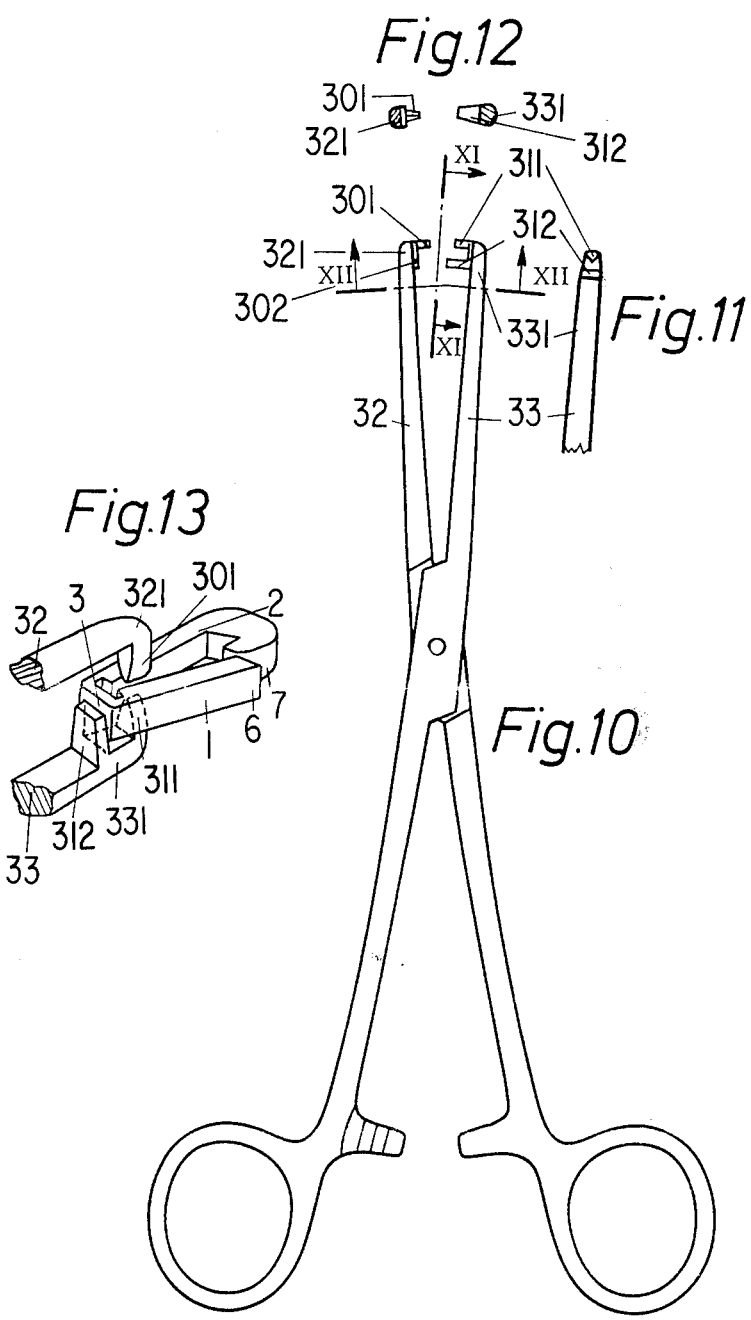

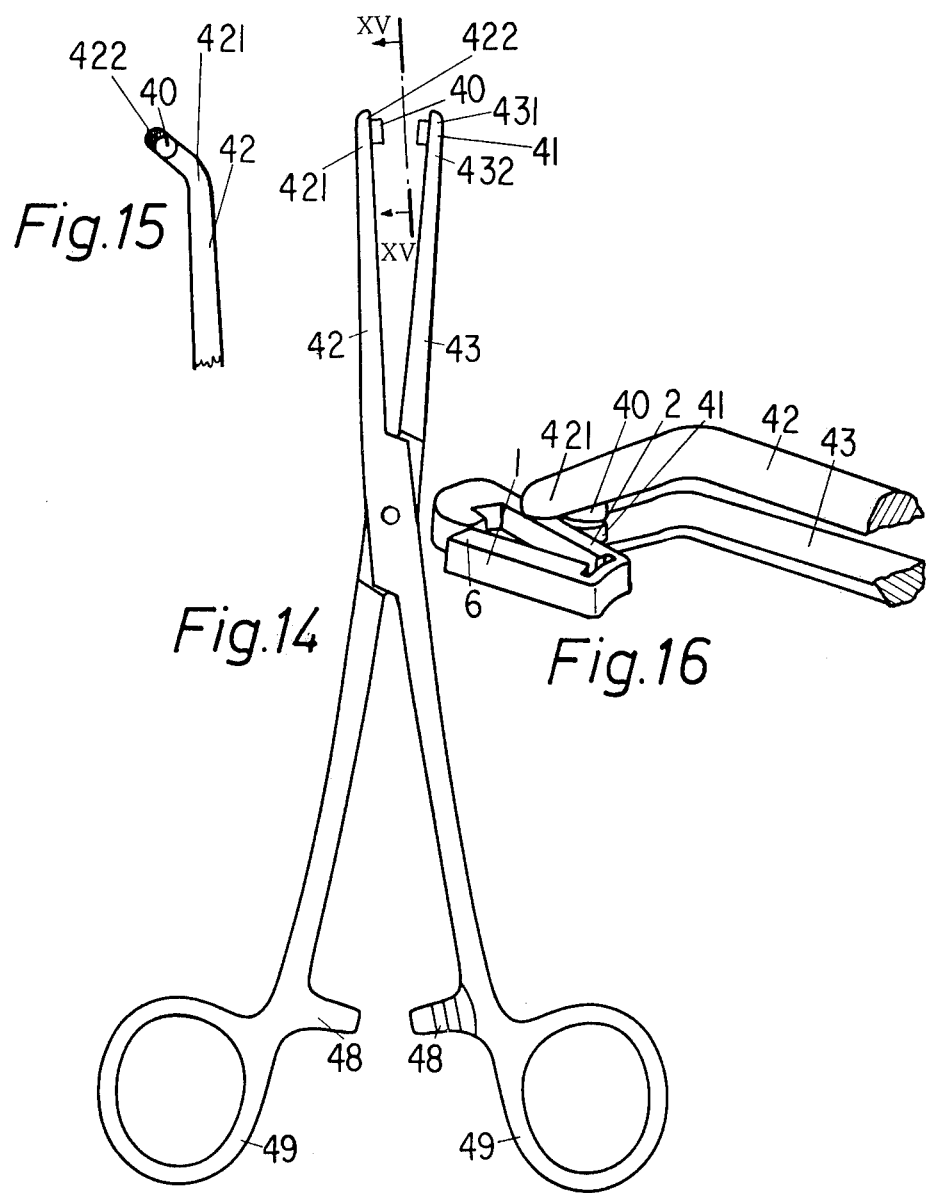

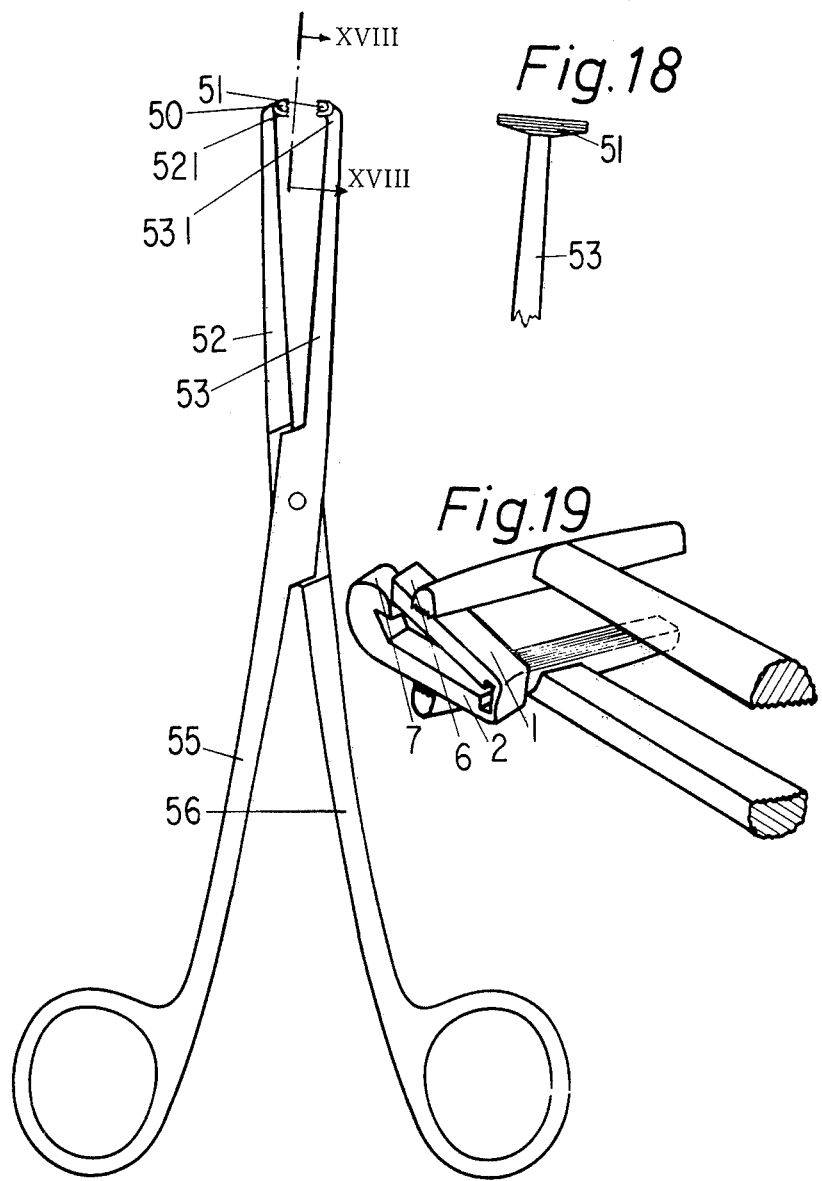

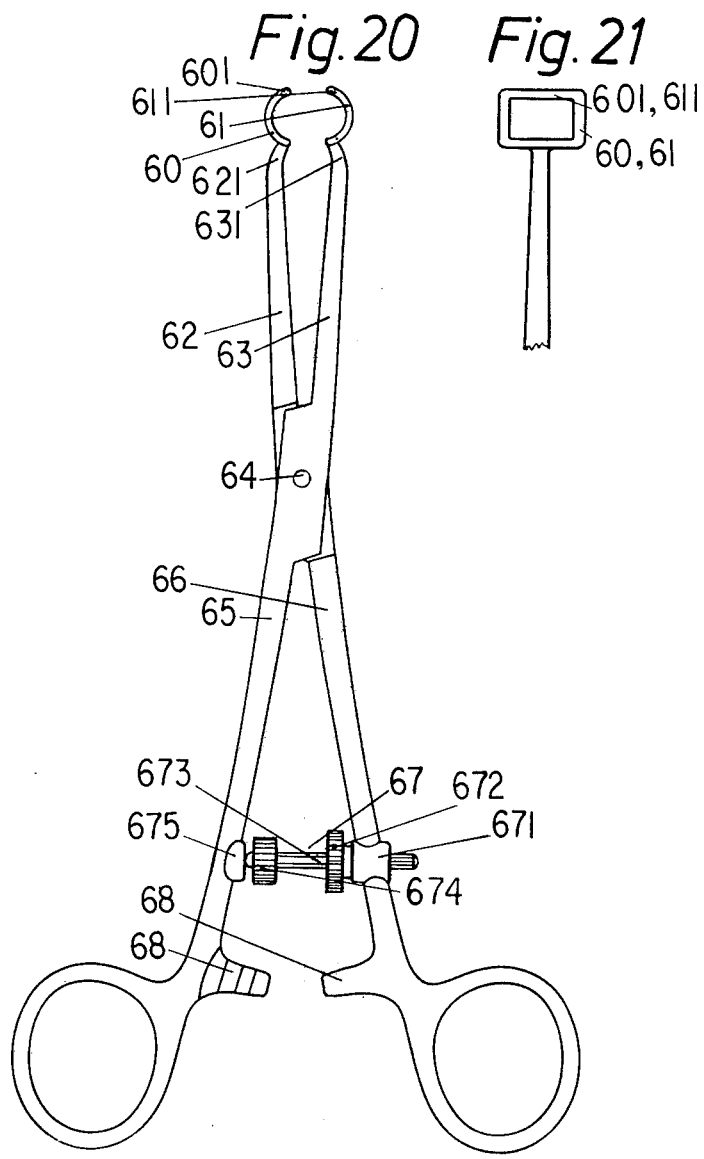

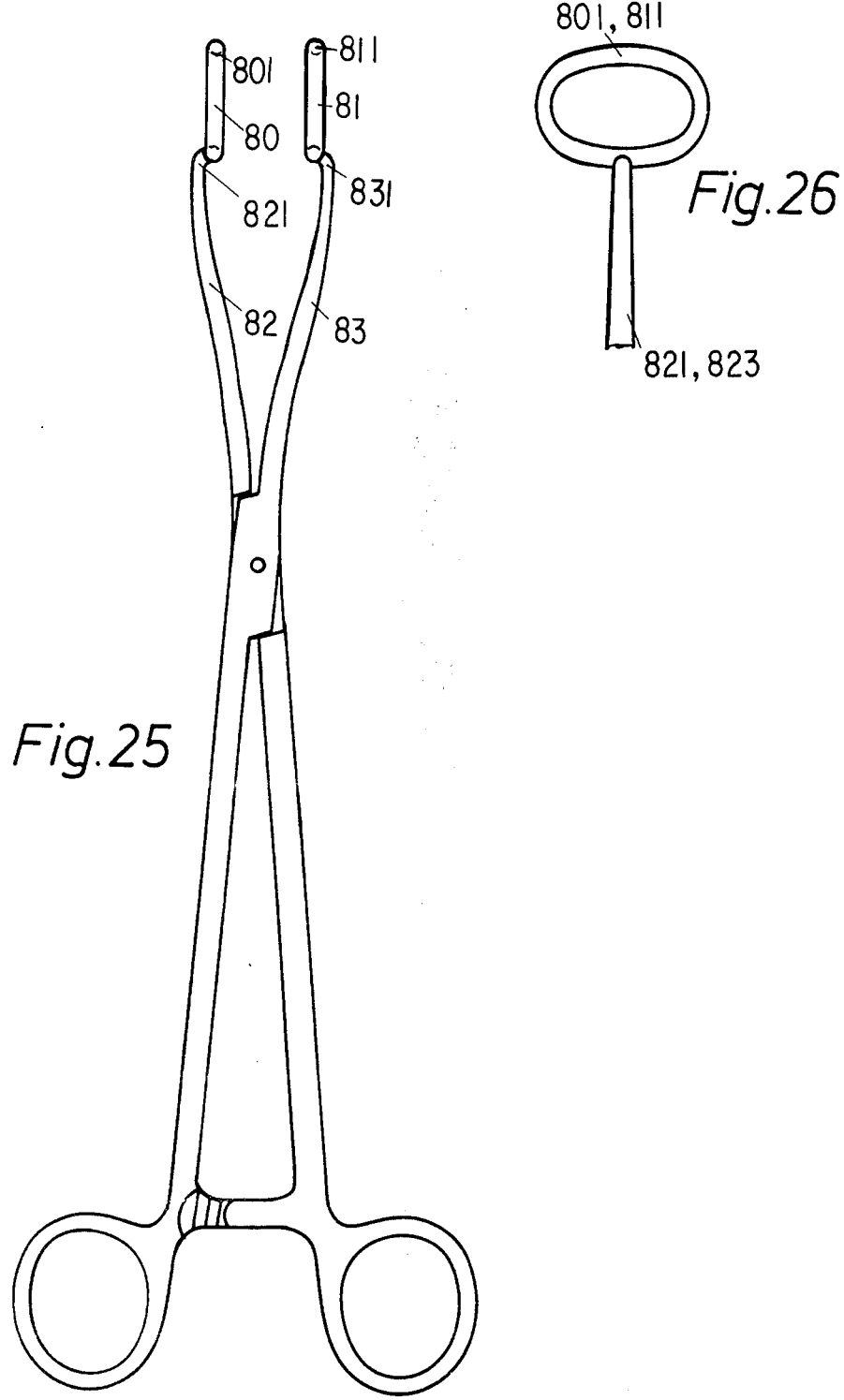

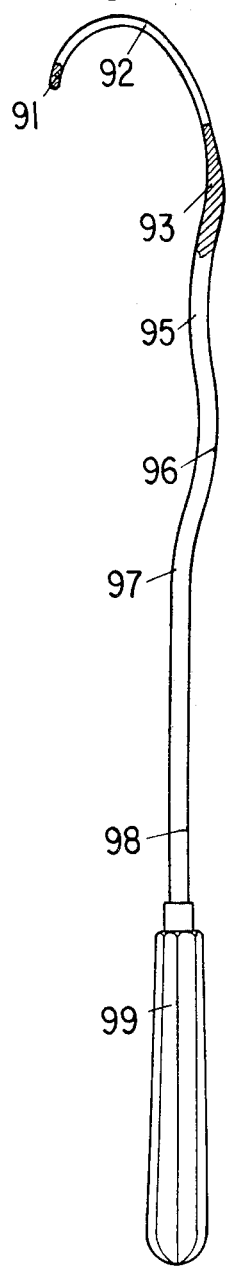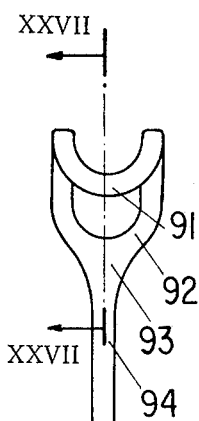

CLIP, CLAMPING JAW AND ASSEMBLY FOR THE INTERRUPTION OF THE UROGENITAL SYSTEM

FOREIGN APPLICATION PRIORITY DATE

Of German Patent application No. P 22 20 117.8 filed on April 25, 1972, is claimed under the Convention.

BACKGROUND OF THE INVENTION

1. Field of the Invention

A clip, clamping jaw and package for the long term interruption of the oviduct and vas deferens.

2. Description of the Prior Art

The prior art is represented by U.S. Pat. Nos: 3,247,852; 3,040,749; 3,204,636; and 3,680.542.

The prior art patents have the common disadvantages and that:

they provide devices which, because of their shapes and configurations disclosed are necessarily too large to permit an accurate manipulation in the human or animal body;

the clip-closing mechanisms are complicated, heavy, cumbersome and expensive;

there are grooves in the clamping jaws extending parallel to the axis of the pathway which is intended to be closed, thereby increasing the difficulties in providing accurate closures;

they provide a resilient loop to interconnect the two jaws of the clip, thus creating a danger that the oviduct eventually may move into the loop and reopen in the loop zone;

during continuous usage in the course of time the gap between the clamping jaws at the loop increases more than the clamp and where the closure device is disposed, creates a wedge effect;

they do not operate reliably and are in addition to other disadvantages, unsuitable for a long-term interruption of the oviduct.

The last mentioned reference and others necessitate serious surgery.

The conventional way of closing pathways in the human or animal organisms, such as the oviduct and the vas deferens, is to sever the pathway, then ligate the exposed ends with conventional surgical sutures. The conventional procedure for interrupting the oviduct is to open the abdominal cavity by an incision of the abdominal wall, for which a relatively long inpatient treatment is necessary. More particularly, the patient needs supervision to ensure that the wounds arising from the severance heal properly, and there is a risk of secondary hemorrhages in the abdominal cavity. Because of all these factors, the morality and morbidity rate for this procedure is at present far too high; also, none of the conventional methods involving bleeding for sterilization of the oviduct has yet proved completely satisfactorily.

SUMMARY OF THE INVENTION

The Objects of the Invention are to provide an improved clip, clamping jaw and assembly for the reversible or irreversible interruption of the oviduct and vas deferens;

to provide a device permitting fitting of the clip even though the oviduct is in an unsatisfactory position;

to provide a complete package assembly for a physician of a supply of clips of various sizes and of various instruments pertaining to operations on the urogenital system, having common parts interfitting with said clips with each part developed properly for the specific purpose for which it is intended, and engageable with the clips of the present invention.

Other objects and many attendant advantages of the invention will become apparent to those skilled in the art from the following description and accompanying drawings.

BRIEF DESCRIPTION OF THE DRAWINGS

FIG. 1 is a side elevation scaled to original size of a clip for interrupting human oviducts;

FIG. 2 is a front elevation of the clip shown in FIG. 1 in a tenfold enlargement;

FIG. 3 is a plan view of the clip shown in FIG. 1 in a tenfold enlargement;

FIG. 4 is a side view of the clip shown in FIG. 1, with a straight flat spring in a tenfold enlargement;

FIG. 5 is a partial side view of the clip shown in FIG. 1, with an inwardly bent flat spring, ten times enlarged;

FIG. 6 is a side view of clip-opening clamps used for handling the oviduct clip of FIGS. 1 to 5 in accordance with the present invention;

FIG. 7 is a side view of the clip-opening clamp of FIG. 6;

FIG. 8 is a cross-section along the line VIII—VIII of FIG. 7 with a clip-opening button;

FIG. 9 shows in perspective the relative positions of the clip-opening clamp of FIG. 7, as introduced into the transverse groove of the clip of FIGS. 1 to 5 to open a closed clip;

FIG. 10 is a side elevation of the clip expanding and -fitting clamp of the present invention;

FIG. 11 is a front elevation of the inside surface of the clamping jaw of the clamp of FIG. 10, on the line XI—XI of FIG. 10;

FIG. 12 is a cross-sectional view on the line XII—XII of FIG. 10 through the two tips of the operative ends of the clamp where the clamping jaws are disposed;

FIG. 13 shows in perspective the relative positions of the clip-expanding and -fitting clamp of FIG. 7, as introduced between the two clip jaws to expand the clip;

FIG. 14 is a side elevation of the clip-holding clamp;

FIG. 15 is a plan view of the inside surface of one operative end of a clamp on the line XV—XV of FIG. 14;

FIG. 16 is a perspective view of the clip-retaining clamp retaining or holding the clip;

FIG. 17 is a side elevation of the clip-closing clamp;

FIG. 18 is a plan view of the inside surface of an operative end of the clip-closing clamp on the line XVIII—XVIII of FIG. 17;

FIG. 19 shows in perspective the relative positions of the clip-closing clamp fitted to the two clip jaws for closure of the clip;

FIG. 20 is a view in side elevation of the oviduct-holding clamp;

FIG. 21 is a plan view of the inside surface of one operative end of the oviduct-holding clamp;

FIG. 25 is a side elevation of the ovary-holding clamp;

FIG. 26 is a plan view of the inside surface of one operative end, of a clamping jaw of the ovary-holding clamp of FIG. 25;

FIG. 27 is a longitudinal section through the uterus hook, scaled to half of its normal size, on the line XXVII—XXVII of FIG. 28;

FIG. 28 is a plan view of the uterus hook scaled to half of its normal size;

DESCRIPTION OF THE PREFERRED EMBODIMENTS

Figure 5A:
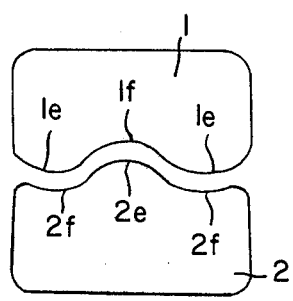
FIG. 5a is a cross-sectional view of the clip showing the longitudinal raised parts and the recessed parts on the clamping surfaces.

FIGS. 1 to 5b illustrate an embodiment of a clip for closing or interrupting a human oviduct. The oviduct clip is made as a single piece of preferably plastic material, sufficiently stiff in thicker portions and flexible in thinner portions. The clip is inert to body fluids and body tissues and includes the following major elements: two rigid clamping jaws, a shorter clamping jaw 1 and a longer clamping jaw 2, with substantially parallel inside clamping surfaces 1a and 2a, forming an oviduct clamping slot 8 between them in the closed position of the clip.

The two rigid clamping jaws 1 and 2 are joined together at one of their outer ends by a resilient bridge 3 connecting the outer parts 1b and 2b of the clamping jaws at these ends forming a transverse slot 4 communicating and continuous with the clamping slot 8 between the inside surface 3a of the resilient bridge 3 and the inner parts of the clamping jaw 1c and 2c at these ends. The resilient bridge 3 is preferably in the form of a flat spring, having its axis perpendicular to the clamping surfaces 1a and 2a.

The free end of the longer clamping jaw 2 extends with a lip 7 around a limb 6 of the free end of the shorter clamping jaw 1, thus forming a latching mechanism in the closed position of the clip.

The lip 7 at the free end of the longer clamping jaw 2 and the limb 6 at the free end of the shorter clamping jaw 1 form, with their inclined inside surfaces 7b and 6b, an inclined slot 5 which communicates and is continuous with the clamping slot 8 of the clip in its closed position. Slot 5 is designed so as not to be wider than clamping slot 8.

The inside surface portion 7a of the lip 7 extends parallel to the inside surface portion 6a of the limb 6, that preferably is a continuation of the outside surface 1d of the shorter clamping jaw 1. The surface portions 6a and 7a are in mechanical contact when the clip is closed.

In FIG. 5, the resilient bridge 3 is bent inwardly toward the slot 8 of the clip.

The advantage of the inwardly curving resilient bridge feature is that with such a clip there is no risk of any of the oviduct gradually shifting from a narrow-gap clamping zone to a wider-gap clamping zone and thus partly re-opening. In an alternative embodiment the resilient bridge has a slight outwards curvature or else is not straight nor slightly bent but is wavy. The transverse groove bounded by the limb aids in the distribution of the bending stress over a large volume of material.

The oviduct clip is less than 1 cm long and is very light, weighing approximately from 0.1 to 3 grams, preferably from 0.25 to 0.5 grams. With the clip closed, the space between the inside surfaces of the clip jaw is less than twice the average wall thickness of the oviduct — approximately 0.2 mm in the case of human oviducts.

Advantageously, to further improve reliability, referring to FIG. 5a, the inside surfaces 1a and 2a of the clamping jaws 1 and 2 have longitudinal raised parts 1e and 2e and recessed parts 1f and 2f which interfit with one another, preferably in this case, with the clip closed, all those parts of the clamping surfaces which are opposite one another are equidistantly spaced. Clamping jaws 2 shows in cross-section the clip with longitudinal raised parts 1e and 2e and recessed parts 1f and 2f on the clamping surfaces 1a and 2a.

Figure 5B:
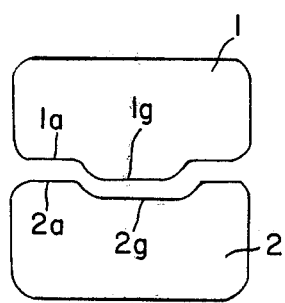
FIG. 5b is a cross-sectional view of the clip showing the ridge on one clamping surface and the groove in the other clamping surface.

FIG. 5b shows in crosssection the clip with a ridge 1g on the clamping surface 1a and a groove 2g in the clamping surface 2a.

FIGS. 5a and 5b depict the clamping surface 1a of the first clamping jaw 1, the outward parts 1b of the first clamping jaw 1, the inward parts 1c of the first clamping jaw 1, the outside surface 1d of the first clamping jaw 1, the clamping surface 2a of the second clamping jaw 2, the outward parts 2b of the second clamping jaw 2, the inward parts 2c of the second clamping jaw 2, the outside surface 2d of the second clamping jaw 2.

The length of the clamping surfaces 1a and 2a of both clip jaws is at least equal to half the external periphery of the pathway to be interrupted; preferably such length is greater, being approximately from 6 to 10 mm in the case of clips for human oviducts. Preferably, the width of the clamping inside surface is equal to from one half to twice the outside diameter of the pathway to be interrupted, being approximately from 3 to 6 mm in the case of clips for human oviducts. As shown in FIG. 5b, a ridge 1.5 mm wide and 0.4 mm high extends over the length of the inside clamping surface 1a of the jaw 1 and is engageable with a 1.5 mm wide and 0.5 mm deep groove 2g in the clamping surface 2a of the other jaw 2 in an interfitting fashion.

In one embodiment of the clip according to the invention, the limb outside surface and the lip inside surface incline inwards towards the center of the clip at an angle in the overlap zone.

The clip according to the invention is used only once and remains in the human organism for a considerable time, possibly several decades. The material used for the clip must be compatible with the organism and must be hot sterilizable by irradiation. Preferably, therefore, the clips are made of plastics, such as polyformaldehyde, polyesters, polysters, polycarbonate or other tough plastics or their mixtures compatible with living tissue, more particularly the material known under the Trademark of "HOSTAFORM C" which has already been used for many years in the preparation of acetabula. All the edges and corners of the clip are rounded to avoid injury to tissue.

To interrupt an oviduct, the clip, if it is closed, is first opened by means of the clip-opening clamp, the button thereof being introduced into the diagonal transverse groove between the limb and the projection for the clip lip. When the clip-opening clamp closes, the limb is pushed so far forwards as not to be engageable by the lip.

The clip-expanding and -fitting clamp is then used.

THE CLIP-OPENING CLAMP

FIG. 6 shows in side elevation an improvement on a typical embodiment of a conventional clip-opening clamp constructed according to the invention;

the clamp parts of the prior art are shown in thin lines and the improved parts according to the invention are shown in heavy lines. There can be seen clamping jaws 10, 11 which are disposed at the tips or apexes 121, 131 of the clamp operative ends 12, 13; a clamp lock 14 having a pivot 114; clamp operating arms 15, 16, a spacer 17 and a nut 171 rigidly secured to the arm 16, an externally knurled nut 172 on a screwthreaded spindle 173, an externally knurled screw head 174 and an abutment 175 rigidly secured to arm 15. The clamp has a lock 18 and grip rings 19. The spacer 17 may be useful and/or necessary for other clamps according to the invention, e.g. the fimbria-holding clamp, the ovary-holding clamp etc.

The clip-opening clamp is approximately 30 cm long and must be at least 25 cm long; it may often be 35 or 40 cm long or even longer in special cases, e.g. in veterinary medicine. The ratio between, on the one hand, the length of the "business" or operative ends of the clamp as far as the clamp lock and, on the other hand, the clamp operating arms is preferably 1:2 but for special purposes can be anything from unity up to 1:3. The improvement in this clamp is based more particularly on the special construction of the clamping jaws at the tips of the operative ends of the clamp. One jaw has two wedge-shaped raised parts set back from 3 to 4 mm from the apex or tip and disposed substantially perpendicularly on the inside of one of the operative ends of the clamp. The raised part or protuberance or the like set back 3 to 5 mm from the outermost apex of the clamp acts as an abutment adapted to cooperate with the outer part of the flexible portion of the clip. The forwardmost protuberance at the outermost end of the clamp serves to expand the clip. The other operative end of the clamp also has at its outermost tip, and exactly opposite the forwardmost protuberance of the first operative end, a protuberance which also serves to expand the clip. The second raised part or protuberance or the like on the first operative member of the clamp is of a length slightly less — from 0.2 to 1 mm less — than clip width, so that with the clamp in the closed state, the clamping jaw inside surfaces retain the clip behind the outermost tips.

FIGS. 7 to 9 illustrate the clip-opening and its use. The same is devised as shown in FIG. 6 but has no spacer 17. The operative end 22 is straight and has no clamping jaw at its tips or apex 221. The operative end 23 is from 2 to 10 mm, preferably from 3 to 6 mm, shorter than the operative end 22 and has on the inside surface of tip 231 a conical button 211 which extends inwards perpendicularly to the last-mentioned surface.

FIG. 9 is a perspective view showing how the clip-opening clamp is used to open a clip. Button 211 is introduced into groove 5 of the clip; upon closure of the clip-opening clamp the limb 6 is moved forward to an extent such as to move the clip opening out of the zone of engagement with the lip 7. This clamp is used should the clip close accidentally before or during the operation of fitting it or at reopening of the oviduct after an interruption lasting years to permit fertilization of the ovum.

The CLIP EXPANDING AND FITTING CLAMP

FIGS. 10 to 13 show an embodiment of the clip-expanding and -fitting clamp and, in a perspective view, the operation of expanding the clip. The operative ends 32, 33 of the clamp are substantially symmetrical but have different clamping jaws on the inside surfaces of their tips 321, 331. The jaw of the operative end 32 comprises a conical button 301 so disposed on the inside surface of tip 321 as to be perpendicular to such surface. The button 301 widens conically on both sides and inwardly from the tip and drops forwardly and outwardly substantially perpendicularly to the axis of the operative end of the clamp. That inside surface of the tip of the end 321 which follows the button has a slightly raised part 302 which acts as an abutment for the clip member 3 shen the clip is expanded.

The jaw of the other operative end 33 of the clamp also takes the form of a conical button 311 at its outermost tip, the button 311 being substantially symmetrical of the button 301 and being disposed opposite the same. Disposed on the inside surface of the tip end 33 and at a spacing which is from 50 to 200 percent greater than the width of the clip member 3, is an abutment 312 for the outside portion of the clip member or spring 3. Abutment 312 is mounted perpendicularly to the inside surface of the front clamp tip 331 and its length is from 1 to 20 percent less than the width of the clip which it is rewuired to expand.

To expand and hold the clip, the same has its portion 3 introduced between abutment 312 and button 311, whereafter the clamp is carefully closed so that the button 321 expands the clip jaws 1, 2 to an extent such that the oviduct can be introduced into the gap between the clip limb 6 and the clip lip 7. With the clip-expanding and -holding clamp is the closed state, the spacing between the two tips of the buttons 301, 311 is preferably from 5 to 70 percent, preferably from 10 to 50 percent, of the width of the clip to be expanded. In this position the clip is held firmly by way of its part 3 between the two jaws of the clamp.

The clip-expanding and -fitting clamp can be either straight shaped or have an inward or outward bend. For the special requirements of veterinary practice, such clamp can be embodied in sizes other than those hereinbefore referred to. This clamp enables the clip to be opened by approximately 4 mm inside the abdominal cavity, whereafter the opened clip is slid over the oviduct and retained by means of the clip-holding clamp before the clip-expanding and -fitting clamp is removed.

The CLIP-HOLDING CLAMP

FIGS. 14 to 16 show a special clip-holding clamp construction. The clamp operative ends 42, 43 are laterally bent at their apexes 421, 431 at an angle of from 40° to 110°, preferably from 45° to 90°, and have on their inside surfaces, at a distance from the outermost clamp tip corresponding to from half to all the thickness of the clip jaw 2, cylindrical protuberances 40, 41 which are mounted perpendicular on the inside surface of the jaws and whose diameter is equal to or less than the width of the inside surface of the apexes of the clamp operative ends, twice the height of the protuberances 40, 41 being from 5 to 20 percent less than the width of the clip to be retained. At their outermost ends the insides of the tips 421, 431 are grovved or the like.

Advantageously, the tips 421, 431 are bent and have projections at the bend site, so that one jaw of the clip-closing clamp described hereinafter can, if required, be fitted to such projections to close the clip.

FIG. 16 shows how the clip-holding clamp is used to hold a clip. The same is held at its jaw 2 which bears the lip 7. The clip-holding clamp is applied approximately to the center of the jaw 2 so that the clip-closing clamp can be applied to the clip at the level of the limb 6.

The dimensions of the clip-holding clamp are very similar to those of the clip-expanding clamp, being approx. 30 cm long and with a 1:2 ratio between the length of the operative ends and the length of the arms as far as the lock pivot; preferably, the clip-holding clamp is straight but it can have an inwards or outwards bend or be bent over the surfaces. The tips or apexes of the operative ends of the clamp are bent laterally at an angle of from 40° to 110° at a distance of from 5 to 20 mm, preferably 7 to 12 mm, from their ends. Disposed on the tip inside surfaces at a distance from the outermost tips corresponding to from half to all the thickness of the clamping jaw of the clip to be held, are two inwardly directed and preferably perpendicular abutments which are disposed one opposite another and which together have a length less than clip width. For improved clip retention, the inside surfaces of the tips of the operative ends of the clamp are striated or grooved or the like from the outermost ends as far as the abutments just described.

The clip-holding clamp has a lock. When such clamp is in the closed state, the clip is retained, by way of the outermost clamp ends, on the jaw which at one end merges into the lip of the clip catch mechanism. The clip-holding clamp is so devised that it can close the clip without the clip-holding clamp having to be opened.

The CLIP CLOSING CLAMP

FIGS. 17 to 19 show a preferred embodiment of the clip-closing clamp and the use thereof to close the clip. The operative ends 52, 53 of the clamp and the clamping jaws 50, 51 are of symmetrical construction and are exactly opposite one another. T-shaped clamping jaws 50, 51 are provided on the inside surfaces of the tips of the jaws 521, 531 and have inside surfaces which are grooved lengthwise of the jaws and which prevent the clip-closing clamp from slipping off the clip when the same is being closed. In special cases the clamping jaws can be bent in just one direction, preferably at an angle of from 70° to 110°, at the operative ends of the clamp. The clamp-operating arms 55, 56 have a slight outwards bend, to enable extra force to be applied as a result of resilient deformation of such arms when the clip is being closed.

Preferably, the clip-closing clamp is 30 cm long but can be from 25 to 35 cm long; it must be at least 20 cm long. The length ratio previously referred to is approximately 1:2 but can vary in special circumstances from 1:3 to 1:1.5. Preferably, the instrument is straight, but it can have inwards or outwards bending for special purposes. An important feature of this clamp is that the clip-closing jaw are set back inwardly at the tips of the operative end of the clamp and are disposed transversely of the clamp axis, preferably substantially perpendicularly thereto. Preferably, the clip-closing clamp is so devised that the jaws at its end are disposed in a T-shape transversely of the clamp axis and offset inwardly. The advantage of this feature is that the instrument does not have to be rotated after insertion but can close the clip from either the right or the left. The insides of the clamp jaws are preferabli striated or grooved or the like so as not to slip on the smooth plastics of which the clip is made.

The OVIDUCT HOLDING CLAMP

FIGS. 20 and 21 show a preferred embodiment of the oviductgripping or holding clamp. Operative ends 62, 63 thereof are bent inwardly at their apexes 621, 631 and have at their outermost ends clamping jaws 60, 61 in shape resembling the edges of incomplete hemicylindrical surfaces bounding a sizeable window or aperture. The clamping jaws have front edges 601, 611 respectively and the clamp lock has a pivot 64. The clamp has a spacer 67 comprising a nut 671 rigidly secured to the clamp-operating arm 66, an externally knurled nut 672, a screw-threaded spindle 673, an externally knurled screwhead 674 and an abutment 675 on the clamp-operating arm 65. Through the agency of the catch 68 and spacer 67, the spacing between the jaws 60 and 61 can be fine-adjusted over a wide range with the clamp closed.

The oviduct clamp must be able to grip or hold the oviduct gently so as not to damage it by an over-tight closure and excessive pressure. Such clamp therefore has the spacer to provide fine adjustment of the between-jaws spacing. The clamp is approximately 30 cm long and is preferably straight but can have inwards or outwards bending in special cases. The length ratio previously referred to can be anything from 1:1.5 to 1:2.5.

The oviduct-holding clamp according to the invention has at the tips of its operative ends two clamping jaws shaped to resemble the generated surfaces of hemicylinders. Consequently, when the clamp is closed the jaws co-operate to form a kind of hollow cylinder adapted to receive the oviduct. To prevent injury to the oviduct and to the tissue therearound, those parts of the clamp jaws and of the clamp operative ends which are disposed opposite one antother must be at a minimum spacing of 0.5 mm with the clamp closed. Preferably, when the clamp is in its central position, those nearest parts of its jaws which are opposite one another are at a distance of from 2 to 4 mm apart, the distance increasing to 6 mm in the maximum position. The clamp has a lock device for spacing adjustment.

The jaws at the clamp apex are of rounded convex shape and ungrooved and are devised internally to form a window so that the oviduct can be observed after it has been gripped by the clamp. The thickness of the jaw-forming edging around the hemicylindrical surfaces is from 1 to 3 mm, preferably 2 mm. The maximum diameter of the complete cylindrical surface is from 4 to 15 mm internally, preferably from 6 to 10 mm, depending upon the extent of clamp opening. Clamp jaw width is from 8 to 20 mm, preferably from 10 to 15 mm.

The FIMBRIA-HOLDING CLAMP

Figure 23:
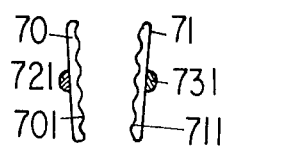
FIG. 23 is a cross-sectional view through the tips of the two operative ends of the clamp with the corresponding clamping jaws, on the line XXIII—XXIII of FIG. 22.
Figure 24:
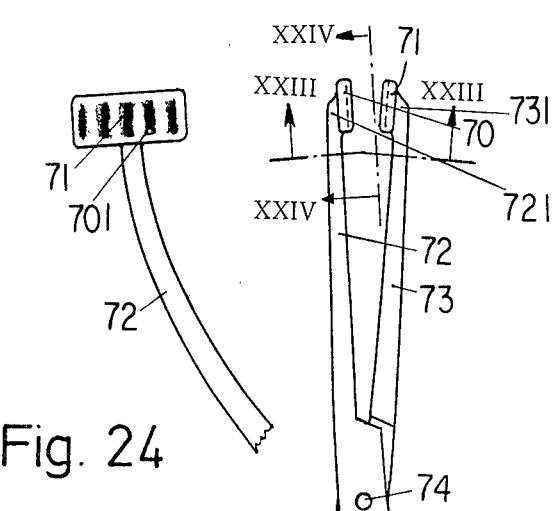
FIG. 24 is a plan view of the inside surface of an operative end of the clamp on the line XXIX—XXIX of FIG. 22 with the clamping jaw of the fimbria-holding clamp in engagement with the clip.
Figure 22:
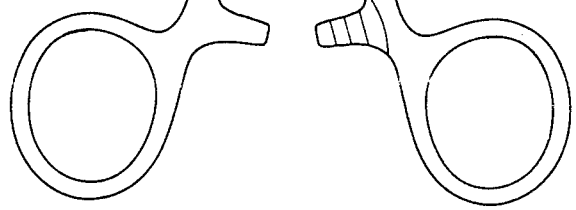
FIG. 22 is a side view of the fimbria-holding or gripping clamp.
Figures 29, 30:
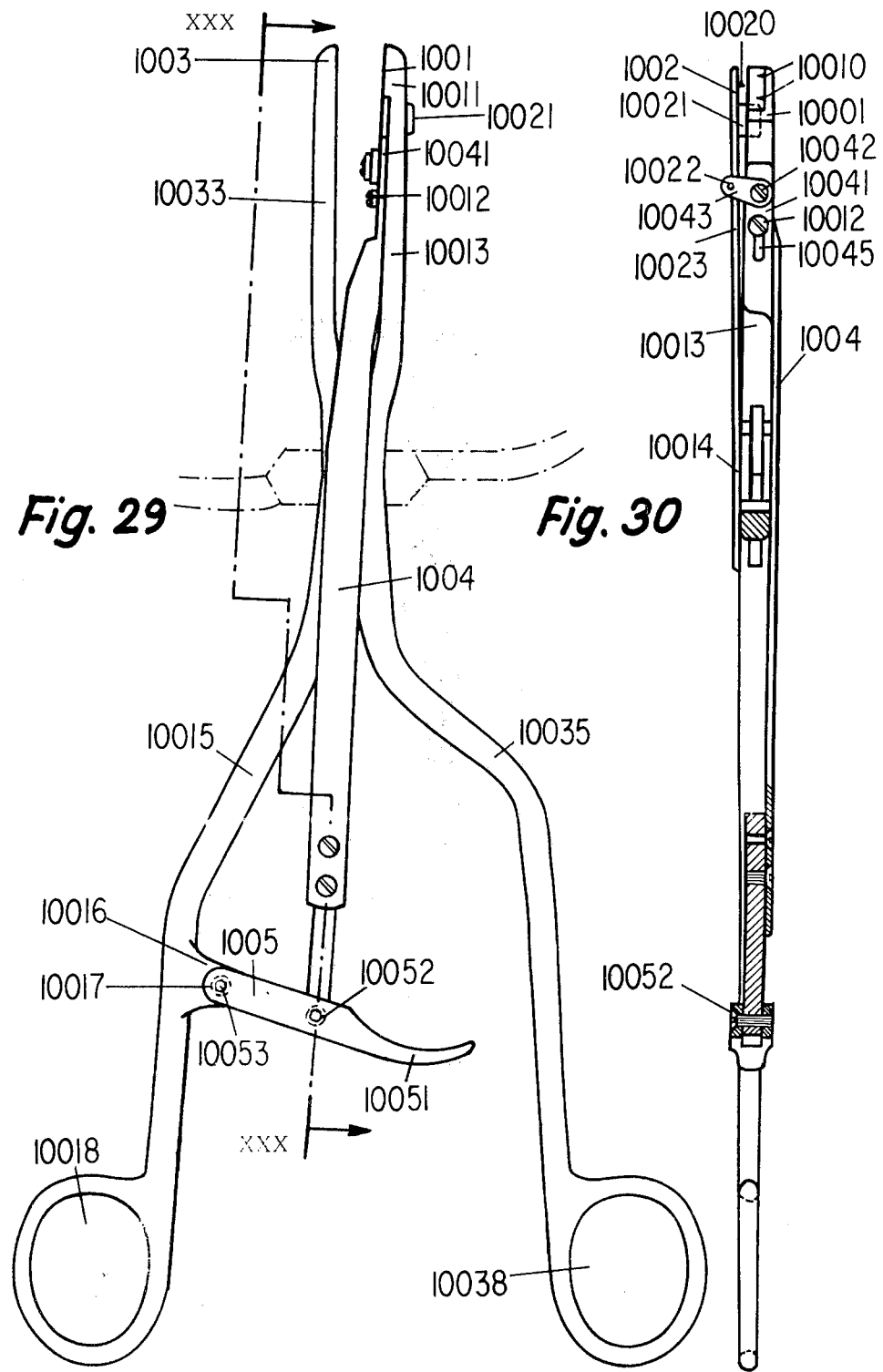
FIG. 29 is a side elevation of the clip-fitting combined clamp.
FIG. 30 is a cross-section through the combined clip-fitting clamp on the line XXX—XXX of FIG. 29.

FIGS. 22 to 24 show the fimbria-holding or gripping clamp. Operative ends 72, 73 thereof have at their apexes 721, 731 clamping jaws 70, 71 having wavy inside surface 701, 711, jaw waviness extending parallel to the clamp axis. The clamp lock has a pivot 74. The members 72, 73 are laterally bent either inwardly or outwardly. The geometry and the catch mechanism of this clamp are so adapted to one another that, with the clamp fully closed, there is no gap at all between the jaw inside surfaces, whereas with the clamp open there is a gap of from 0.3 to 3 mm between such surfaces.

The fimbria-holding clamp is about 30 cm long and the ratio previously referred to is approximately 1:2; preferably, the clamp is slightly bent at its operative ends. The clamp apexes take the form of two flat jaws which are disposed perpendicularly to the axis of the clamp operative ends and which are rounded on all sides and which are from 10 to 30 mm, preferably from 15 to 25 mm, wide and which are from 5 to 10 mm, preferably approximately 7 mm, long on the instrument axis and which are from 2 to 3 mm thick. The inside surfaces of the two jaws which form the clamp apex match one another intimately and are preferably slightly wavy, the waviness of the two flat jaws being adapted to one another and extending transversely of the clamp axis. The clamp has a locking device giving a maximum between-jaws spacing of 3 mm and a minimum between-jaws spacing of 0.2 mm. Preferably, the clamp arms — i.e., the parts between the finger grips and the fulcrum or pivot of the clamp — are provided with a spacer giving controlled adjustment of the clamp.

The OVARY HOLDING CLAMP

FIGS. 25 and 26 show the ovary-holding clamp. Operative ends 82, 83 thereof are bent outwards and their terminal portions 821, 831 are bent slightly inwards. Secured to the outermost tips of the members 821, 831 on the inside thereof are clamping jaws 80, 81 which have front edges 801, 811. The clamping jaws in shape resemble oval rings; with the clamp fully closed the between-jaws spacing is approximately from 10 to 20 mm.

The ovary-holding clamp is approximately 30 cm long and is preferably straight but can have inwards or outwards bending. The ratio previously referred to varies from 1:1 to 1:2 and is preferably 1:1.5. The special feature of this clamp is the clamping jaws at the clamp tips, the jaws being in the form of two matching oval rings disposed one opposite another, for instance, with an inside width of 15 mm and an inside length of 25 mm and an outside width of 21 mm and an outside length of 32 mm. The diameter of the material which forms the oval is from 2 to 4 mm, preferably 3 mm. Those inside surfaces of the two rings which are near one another have substantially the same spacings, from a minimum of 10 mm (protection by abutment) to a maximum of from 20 to 25 mm, depending upon the position of the clamp lock. Preferably, the clamp has a spacer giving controlled closure of the clamp and ensuring that the tissues cannot be injured by over-closing of the clamp.

The UTERUS HOOK

FIGS. 27 and 28 illustrate the uterus hook. The same conprises a hooked metal portion 91 formed with a sizeable window or aperture bounded by side edges 92. The hook narrows into a part 93 having an extension for a grip 94. The device has bends 95–97 for anatomic adaptation of the instrument, which has a straight end 98 and a grip or handle 99.

The uterus hook is as shown in the drawing and has a front part in the form of a hooked structure made of approximately 40 mm wide sheet metal with an internal window or aperture. The hooked apertured metal merges into a rod-like member having a first bend, for adaptation to the uterus, two compensating bends and a handle at its end. The instrument is 30 cm long without the handle and approximately 42 cm long with the handle.

The OPERATION

To fit the clip according to the invention to a human oviduct in an appropriate place, the above described specially developed instruments are needed, viz., a clip-opening clamp, a clip-expanding and -mounting clamp, a clip-holding clamp, a clip-closing clamp. Possibly also a combined clamp, an oviduct-holding clamp, a fimbria-holding clamp, an ovary-holding clamp and an uterus hook are required. The clip according to the invention can be used, for instance, as a very simple means of providing a permanent interruption of the oviduct but is free from the disadvantages mentioned. To interrupt the oviduct, the clip is inserted through the fornix posterior vaginae by means of the clip-expanding and -fitting clamp, placed around the oviduct and closed by means of the closing clamp. The operation takes only a few minutes and can be performed under local anesthesia with virtually no pain.

The main advantages are that there is no wounding of the abdominal cavity and therefore no risk of secondary hemorrhage of the oviduct; also, the invention makes it possible for the first time ever, thanks to the clip, to sterilize the oviduct without hemorrhage in such a way as to completely inhibit the passage of sperms or ova. Another advantage is that, contrary to conventional teaching, the method is reversible.

The clip has already proved satisfactory in about 50 cases. Another advantage is the smallness and lightness of the clip, so that the oviduct is unstressed and the tissue near the oviduct is not irritated. This has been proved by histological testing carried out after the fitting of the clip by Prof. M. Piroth, of the Pathological Institute of the Rastpfuhl Hospital, Saarbruecken/Saar.

The clip according to the invention is of course also of use for interrupting the oviduct in the course of surgery involving opening-up of the abdominal cavity.

When the clip is fitted via the fornix posterior vaginae, the oviduct is occasionally not readily accessible, in which case the oviduct must be advanced by means of the oviduct-holding clamp or of the fimbria-holding clamp; it may occasionally be necessary to use an ovary-holding clamp or an uterus hook as well.

The complete set of the three clamps for inserting, fitting and closing the clip has the advantage of enabling the clip to be brought to the operation area, —i.e., to the oviduct—reliably and properly expanded and placed around the oviduct in the correct position, whereafter the clip can be transferred to the clip-holding clamp before the expanding and fitting clamp is released, whereafter the clip can be closed without releasing the holding clamp and thus without impairing retention of the clip. The person performing the operation can therefore fit the clip to an oviduct rapidly and reliably with very little manipulation; the operation can be therefore performed by medical personnel other than fully trained doctors.

Thus in the operation of closing an oviduct according to the invention, the clip is opened with the clip-opening clamp and expanded with the clip-expanding and -fitting clamp, the oviduct is exposed by means of the oviduct-holding clamp and/or the fimbria-holding clamp, with or without the use of the ovary-holding clamp or uterus hook, the expanded clip is pushed over the oviduct by means of the clip-expanding and -fitting clamp, the clip is retained by co-operation between the clip-holding clamp and the second jaw of the clip, the clip-expanded and -fitting clamp is opened and removed and the clip is closed by using the clip-closing clamp to press the limb and the second clamping jaw of the clip together, whereafter the clip-holding clamp is opened and the two clamps are removed.

The COMBINED CLIP FITTING CLAMP

There are great advantages in using a combined clip-fitting clamp instead of the clip-expanding and space-fitting clamp, clip-holding clamp and clip-closing clamp for some operations, the combined clamp providing the functions of the other three. The combined clamp as shown on FIGS. 29 – 32 is provided with two clamp necks 10013, 10033, which are substantially straight and symmetrical. However, the neck 10013 for the receiving jaw has various extra attachments on both sides and on its inside.

A right-angled clip-receiving jaw 1001 is secured to the inside of apex 1011 of neck 10013 and has on its inside needles 10010 to ensure that the clip is retained reliably when the combined clamp is in the closed state. Screw 10012 in the inside surface of neck 10013 guides the front end of expander 10041 in an elongated aperture 10045 when the expander moves lengthwise.

After the clamp lock 10014, operating arm 10015 of the clamp which serves to operate jaw 1001 is bent outwardly and has on its inside a projection or lug or the like 10016 formed with an aperture 10017, arm 10015 terminating in a grip ring 10018.

To retain the clip, a resilient neck 10023 for holding jaw 1002 is screwed on to one side of neck 10013 by screws 10024; neck 10023 moves resiliently, perpendicularly to the plane of the inside surface of neck 10013.

Jaw 1002 at the tip of neck 10023 has on its inside one or more fine needles 10020 for reliable retention of the clip when the clamp is in the closed state; disposed on the jaw 1002 at right-angles thereto is a projection 10021 which slides on the outside of neck 10013 is springing movements and guides the movement of jaw 1002. Normally the resilient neck 10023 presses jaw 1002 tightly against jaw 1001 and, by means of the fine needles 10010, 10020, provides reliable and firm retention of the inserted clip by way of its jaw 2 and projection 7. When closed, the jaw 1002 so engages with the jaw 1001 laterally that the two jaws bound a substantially oblong recess on the inside of the clamp tip, the depth of such recess being less than the thickness of the jaw 2 and projection 7 of the clip, the width of the recess being less than the width of the jaw 2.

Closing jaw 1003 is formed substantially by the inside surface of the apex of neck 10033. After the lock 10014 the arm 10035 which is adapted to operate the closing jaw 1003 bends outwardly and terminates in a grip ring 10038.

When the two rings 10018, 10038 are pressed together, the clip retained by the jaws 1001, 1002 is closed by the pressure of the jaw 1003 on the jaw 1 having the limb.

The expander 1004 for the holding jaw 1002 is so guided on the other side of the neck 10013 as to be movable lengthwise of the clamp. The front end of the expander 10041 is offset by 90° from the central part and slides along the inside surface of clamp 10013 in an elongated aperture 10045, with longitudinal guidance provided by a screw 10012 in neck 10013. Expanding lever 10043 is so secured to the inside of the front end of expander 10041 by a screw 10042 as to be rotatable and is movably connected by a pin to a lateral lug or extension or the like 10022 of neck 10023. When the expander 1004 and its front end move rearwardly, lever 10043 pivots outwardly and presses the resilient neck 10023, and therefore the jaw 1002, outwardly and opens the same. In a surgical operation, a clip which has been closed around an oviduct disengages readily from the tip of the clamp, which can then be removed from the site of the operation.

The expander 1004 can be moved lengthwise by operation of lever 10051 on the expander operating lever 1005, grip 10051 being pivotably connected to lever 1005 by screw 10052 and being pivotably connected by screw 10053 to lug 10016 of arm 10015.

Figure 31:
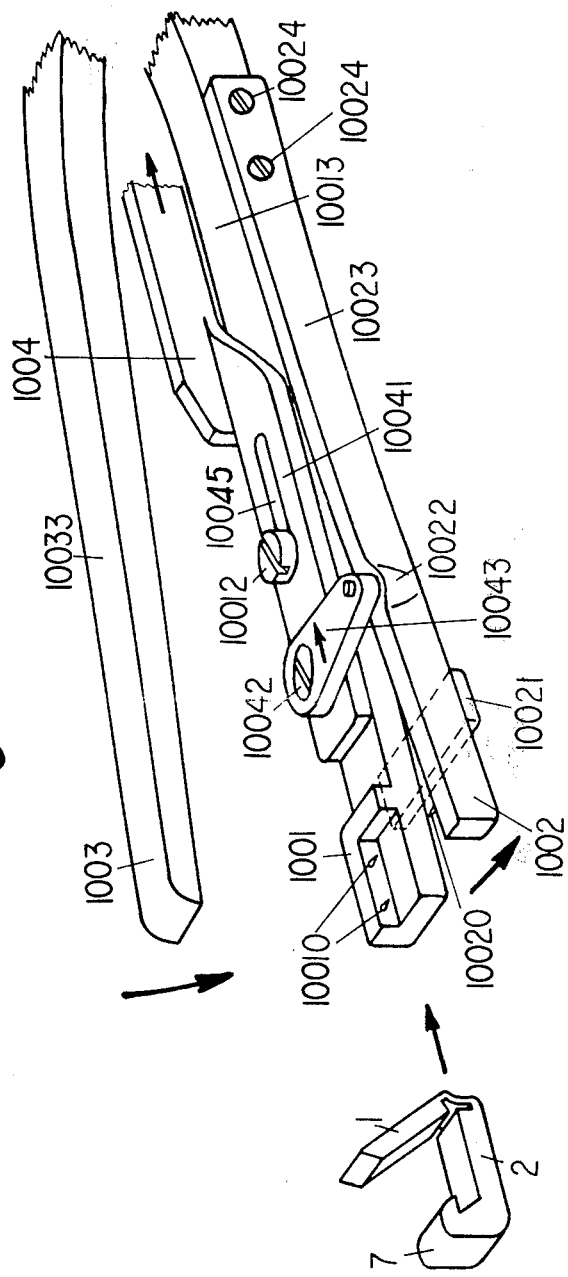
FIG. 31 is a perspective view of the front end of the opened combined clamp with the clip open.

FIG. 31 is a perspective view of the front end of the combined clip-fitting clamp when the same is open. By way of its resilient neck 10023, jaw 1002 is displaced from its normal position, and therefore away from the jaw 1001, by withdrawal of expander 1004 and the resulting outwards pivoting of lever 10043. Jaw 1003 on neck 10033 is open. The drawing shows the position in which the clip is introduced into the opened clamp — i.e., open at the front with its jaw 2 and projection near the receiving jaw 1001 of the clamp.

Figure 32:
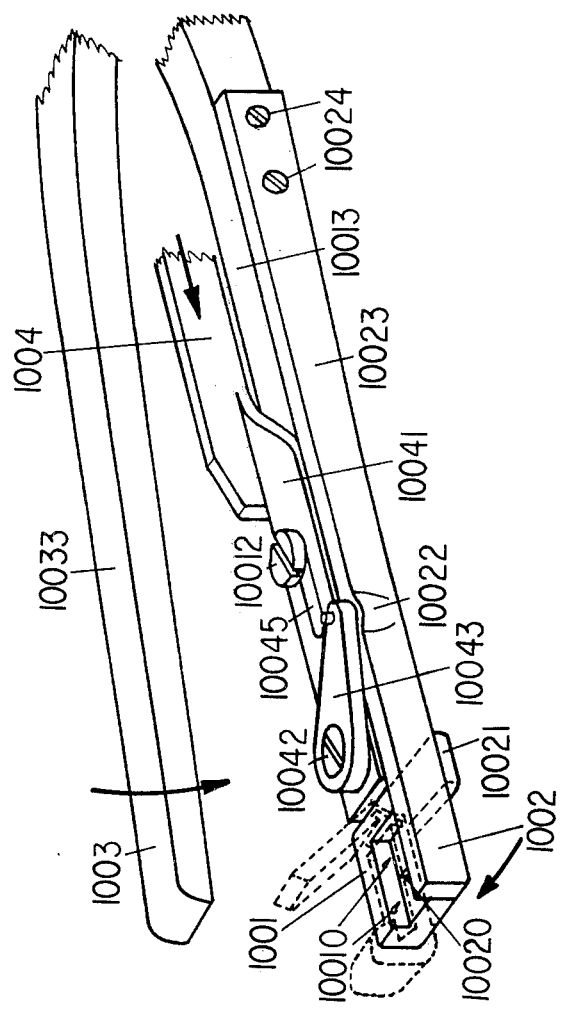
FIG. 32 is a perspective view of the front end of the combined clamp when closed and while retaining an open clip.

FIG. 32 is a perspective view of an open clip in the clamp. After the clip has been introduced between jaws 1001 of the open clamp, expander 1004 is moved forwards and jaw 1002 is pressed tightly against the clip in the jaws 1001 by the spring force of its neck 10023. The clip is retained reliably in the open state by the spring force, plus the securing provided by the fine needles 10010, 10020 which penetrate into the plastics of which the clip is made, and in this state the clip can be introduced into the abdominal cavity and slid over the oviduct.

The arrow associated with the closing jaw 1003 is intended to indicate closure of the open clip retained in the clamp. After closure of the clip the same is released from the instrument just by withdrawal of the expander and the resulting opening of the holding jaw 1002, whereafter the instrument can be moved from the site of the operation.

The open clip is retained in the combined clamp by means of the projection on the clip clamping jaw, between receiving jaws and holding jaws of the combined clamp, the expander which serves to open the holding jaw not being operated. The clamp, with the clip open at the front and the apex, is then introduced through the rear vault of the vagina, into the abdominal cavity, and the clip is slid over the oviduct and closed by operation of the closing jaw. Opening of the holding jaw, an operation effected by operation of an expander, disengages the clip easily from the apex of the clamp, which can be removed from the site of the operation. The combined clamp provides very simple and reliable and reversible closure of oviducts.

The combined clamp is approximately 20 to 60 cm long, preferably 27 to 53 cm, e.g. 30, 35, 38, 45 or 50 cm, but may be larger or smaller even for closing the oviducts of animals. The length relationship of the clamp necks as far as the lock and the operating arms is preferably 1:1.5 to 1:3.5. Preferably, the clamp necks and the attachments thereon are straight, but can be curved for special purposes. The operating arms are bent outwardly after the clamp lock, to give space for the expander operating lever.

While the present invention has been described with respect to particular embodiments, variations can be resorted to without departing from the spirit and scope of the invention as claimed.

We claim:

1. An oviduct clip for long term reversible or permanent interruption of the oviduct and vas deferens in human and animal organisms and for retention in said organisms, to be employed with a combined clip-fitting clamp for fitting the clip on the oviduct and vas deferens in a living organism, comprising:
    two rigid clamping jaws, one being longer than the other, substantially parallel inside clamping surfaces forming a longitudinal oviduct clamping slop between the jaws in a closed position of the clip, each part having a first and second end, said second end being a free end;
    a resilient bridge joining said first ends of said jaws by connecting other portions of the clamping jaws, said bridge forming a transverse slot which communicates and is continuous with the clamping slot, said transverse slot being formed between an inside surface of the resilient bridge and inner first end portions of the clamping jaws;
    the free second end of said longer clamping jaw having an extending lip, and the free second end of said shorter clamping jaw having a limb, said lip extending around said limb to form a latching mechanism in the closed position of said clip; and
    said clip being constructed as a single continuous piece of plastic material which is inert to body fluids and body tissues.

2. An oviduct clip as claimed in claim 1 wherein an inside surface of said lip of said longer clamping jaw and an inside surface of said limb are inclined to the parallel inside jaw surfaces and form an inclined slot which communicates and is continuous with said clamping slot of the closed clip, said inclined slot being not wider than the clamping slot.

3. An oviduct clip as in claim 1 wherein said inside surface portion of said lip is parallel with an outside surface portion of said limb, said two portions being in mechanical contact with each other during the closed position of said clip.

4. An oviduct clip as claimed in claim 1 having an overall length of less than 1 cm., a weight between 0.25 and 0.5 grams and a clamping slot having a width approximately of 0.2 mm in the closed position of the clip.

5. An oviduct clip as claimed in claim 1, wherein said inside clamping surfaces of the clamping jaws have longitudinally raised portions and longitudinally recessed portions, said inside clamping surfaces interfitting with each other in the closed portion of said clip, said inside surfaces being spaced apart by a predetermined uniform distance over the entire inside surfaces of said jaws in the closed position of said lip.

6. An oviduct clip as claimed in claim 1 in combination with a combined clip-fitting clamp for fitting the clip on the ovirduct and vas deferens in the living human and animal organism, said clip-fitting clamp comprising:
    a receiving jaw supported by a neck, said receiving jaw having a receiving compartment adapted to receive said clip, said receiving compartment having an open side;
    a holding jaw for movement toward and away from the open side of said compartment for firmly holding a clip disposed in said compartment, said holding jaw and receiving jaw being movable in a plane of movement;
    a resilient neck for said holding jaw, said resilient neck for pressing said holding jaw against said receiving jaw when said clip is inserted in said receiving jaw compartment;
    a closing jaw, said closing jaw for closing an open clip held in said compartment between said receiving and holding jaws, said closing jaw moving perpendicular to the plane of said receiving and holding jaws;
    an expander affixed to said neck holding said receiving jaw, said expander for moving said holding jaw lengthwise relative to said receiving jaw, wherein said holding jaw may be moved forward or away from said receiving compartment upon lengthwise movement of the expander; and
    means for controlling said expander for moving said holding jaw.

7. A combined oviduct clip and clamp as in claim 6, wherein said receiving jaw and holding jaw have needles disposed on inside surfaces of said jaws, an expanding lever for moving the holding jaw against spring force of said resilient neck; said expander having means permitting it to slide on an inside surface of said receiving jaw neck, said means including an elongated aperture and guiding means within said aperture for guiding the expander longitudinally.

* * * * *